United States Patent
Sabe et al.

(10) Patent No.: US 8,331,616 B2
(45) Date of Patent: Dec. 11, 2012

(54) FACE IMAGE PROCESSING APPARATUS, FACE IMAGE PROCESSING METHOD, AND COMPUTER PROGRAM

(75) Inventors: Kohtaro Sabe, Tokyo (JP); Atsushi Okubo, Tokyo (JP); Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 1094 days.

(21) Appl. No.: 12/191,610

(22) Filed: Aug. 14, 2008

(65) Prior Publication Data

US 2009/0060290 A1     Mar. 5, 2009

(30) Foreign Application Priority Data

Aug. 27, 2007 (JP) ................. 2007-219739

(51) Int. Cl.
*G06K 9/00* (2006.01)
(52) U.S. Cl. ........................ 382/103; 382/216
(58) Field of Classification Search ............... 382/103, 382/118, 216, 218, 285
See application file for complete search history.

(56) References Cited

U.S. PATENT DOCUMENTS

| | | | |
|---|---|---|---|
| 2001/0020946 A1 | 9/2001 | Kawakami et al. | 345/582 |
| 2005/0147292 A1* | 7/2005 | Huang et al. | 382/159 |
| 2005/0265604 A1* | 12/2005 | Yuasa | 382/199 |
| 2006/0204110 A1* | 9/2006 | Steinberg et al. | 382/224 |

FOREIGN PATENT DOCUMENTS

| | | |
|---|---|---|
| JP | 2001-273496 A | 10/2001 |
| JP | 2006-11978 A | 1/2006 |
| JP | 2007-164498 A | 6/2007 |
| WO | WO 03/019475 A1 | 3/2003 |

OTHER PUBLICATIONS

Y. Gao, et al., "Fast Face Identification Under Varying Pose From a Single 2-D Model View", IEE Proceedings: Vision, Image and Signal Processing, Institution of Electrical Engineers, XP 006017131, Aug. 24, 2001, vol. 148, No. 4, pp. 248-253.

Kin-Man Lam, et al., "An Analytic-to-Holistic Approach for Face Recognition Based on a Single Frontal View", IEEE Transactions on Pattern Analysis and Machine Intelligence, XP 000774196, Jul. 1, 1998, vol. 20, No. 7, pp. 673-686.

(Continued)

*Primary Examiner* — Andrew W Johns
(74) *Attorney, Agent, or Firm* — Oblon, Spivak, McClelland, Maier & Neustadt, L.L.P.

(57) ABSTRACT

A face image processing apparatus selects feature points and feature for identifying a person through statistical learning. The apparatus includes input means for inputting a face image detected by arbitrary face detection means, face parts detection means for detecting the positions of face parts in several locations from the input face image, face pose estimation means for estimating face pose based on the detected positions of face parts, feature point position correcting means for correcting the position of each feature point used for identifying the person based on the result of estimation of face pose by the face pose estimation means, and face identifying means for identifying the person by calculating a feature of the input face image at each feature point after position correction is performed by the feature point position correcting means and checking the feature against a feature of a registered face.

14 Claims, 12 Drawing Sheets
(5 of 12 Drawing Sheet(s) Filed in Color)

OTHER PUBLICATIONS

G.C. Feng, et al., "Recognition of Head-&-Shoulder Face Image Using Vitrual Frontal-View Image", IEEE Transactions on Systems, Man, and Cybernetics—Part A: Cybernetics, XP 011056349, Nov. 1, 2000, vol. 30, No. 6, pp. 871-883.

Xiujuan Chai, et al., "Pose Normalization for Robust Face Recognition Based on Stastical Affine Transformation", Information, Communications and Signal Processing, 2003 and Fourth PAC IFIC RIM Conference on Multimedia, Proceedings of the 2003 Joint Conference of the Fourth International Conference on Singapore Dec. 15-18, 2003, XP 010701023, Dec. 15, 2003, vol. 3, pp. 1413-1417.

Japanese Office Action issued Jul. 5, 2011, in Patent Application No. 2007-219739.

Volker Blanz, et al., "Face Recognition Based on Fitting a 3D Morphable Model", IEEE Transactions on Pattern Analysis and Machine Intelligence, vol. 25, No. 9, Sep. 2003, pp. 1-12.

* cited by examiner

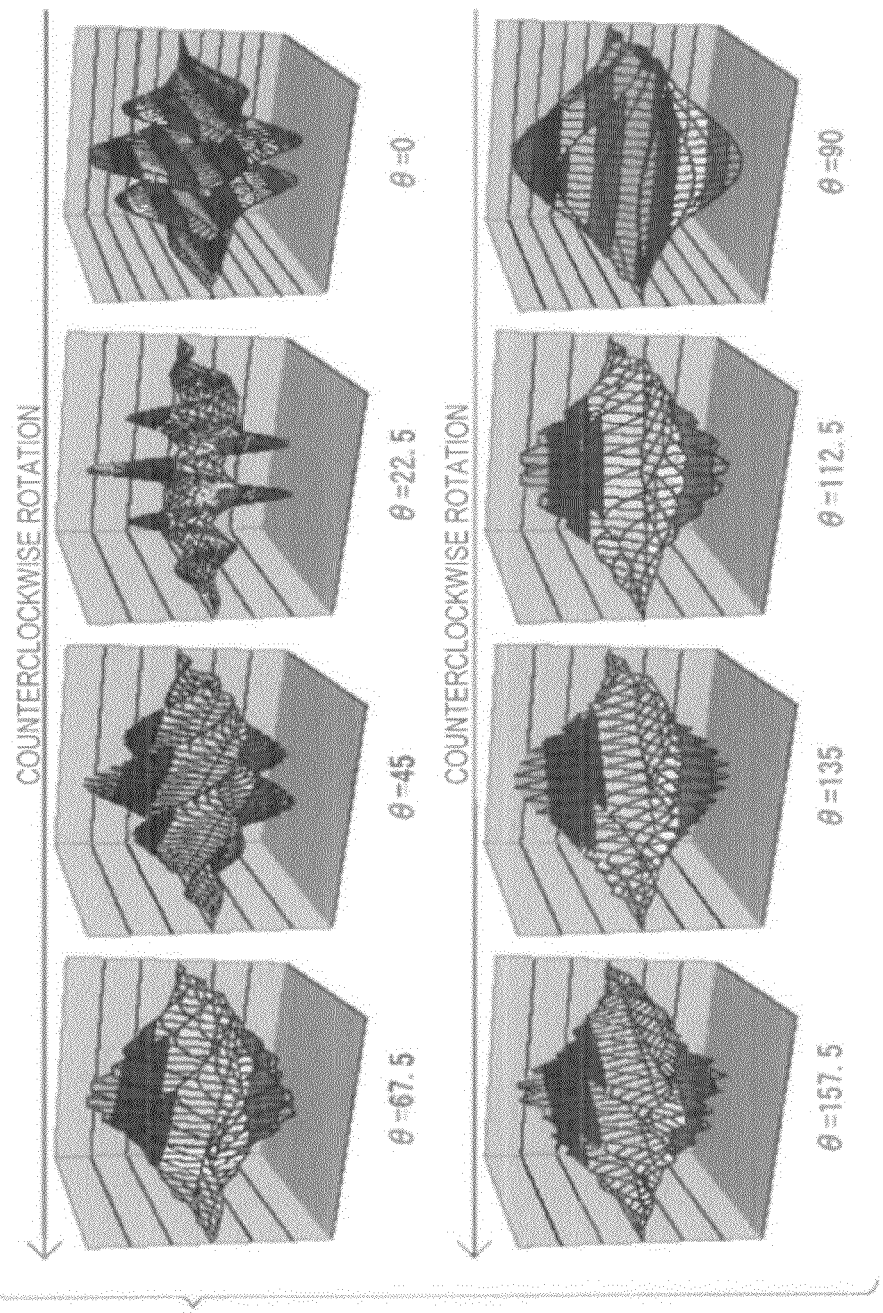

ESTIMATION OF
FACE DETECTION RESULT

MOVE SEARCH AREA
IN THREE STEPS
(LEFT, MIDDLE, RIGHT)

DEFINITION OF 97 POINTS

THREE-DIMENSIONAL FACE MODEL

FACE IMAGE PROCESSING APPARATUS, FACE IMAGE PROCESSING METHOD, AND COMPUTER PROGRAM

CROSS REFERENCES TO RELATED APPLICATIONS

The present invention contains subject matter related to Japanese Patent Application JP 2007-219739 filed in the Japanese Patent Office on Aug. 27, 2007, the entire contents of which being incorporated herein by reference.

BACKGROUND OF THE INVENTION

1. Field of the Invention

The present invention relates to a face image processing apparatus, a face image processing method, and a computer program for recognizing a face image included in a photographic image such as a still picture, a frame of moving images. In particular, the invention relates to a face image processing apparatus, a face image processing method, and a computer program in which feature points or features of an image of interest are checked against a registered image to identify a person.

More particularly, the invention relates to a face image processing apparatus, a face image processing method, and a computer program in which feature points or features used for personal authentication are selected through statistical learning to allow a personal authentication process to be performed using the selected features in a synthetic manner. Specifically, the invention relates to a face image processing apparatus, a face image processing method, and a computer program in which feature points on a registered image and an image to be checked are accurately associated with each other to achieve high recognition performance even when the pose of the image to be checked changes.

2. Description of the Related Art

Face recognition techniques can be widely used in applications of man-machine interface for purposes such as sex identification, a major application of this kind being personal authentication systems which do not bother users. Recently, face recognition is used for automating operations of a digital camera based on detection or recognition of an object, including automatic focusing (AF), automatic exposure (AE), automatic field angle setting, and automatic shooting.

For example, a face recognition system involves a face detection process for detecting the position and size of a face image included in an input image, a face parts detection process for detecting the positions of principal parts of the face from the detected face image, and a face identifying process for identifying the face image (or identifying the person) by checking an image to be checked obtained by correcting the position and rotation of the face image based on the positions of the face parts against a registered image.

Face recognition systems are known, in which feature points or features to be used for identifying a person are selected through statistical learning and in which a personal identification process is performed using the selected features in a synthetic manner (for example, see WO2003/019475 (Patent Document 1)). Features of a face image may be extracted using a plurality of Gabor filters having directional selectivity and different frequency components.

It has already been revealed that some visual cells of human-being exhibit selectivity to a certain direction, and a Gabor filter is a spatial filter formed by a plurality of filters which similarly have directional selectivity. A Gabor filter is spatially represented using a Gaussian function as a window and a Gabor function whose base is a sine function or a cosine function as frequency response. For example, the size of the filter window is fixed at 24×24 pixels. Forty types of Gabor filters are formed when there are five different frequencies f and eight angles θ.

Gabor filter calculations are performed using the forty types of Gabor filters at the maximum provided by switching the frequencies f and the angles θ. The forty sets of scalar values at the maximum thus obtained are referred to as "Gabor jets". A Gabor jet is obtained as a local feature at each of feature extracting positions detected at predetermined intervals in the horizontal and vertical directions of face image data. Gabor jests are characterized in that they are robust against a certain degree of displacement or deformation of feature extracting positions.

For a registered face image, a Gabor jet is calculated in advance at each feature extracting position of the image. Degrees of similarity between Gabor jets of an input face and Gabor jets of a registered face at the same feature extracting positions are calculated to obtain similarity vectors which are sets of degrees of similarity at a plurality of feature extracting positions. Then, the vectors are classified by a support vector machine (SVM) to recognize the image to be checked and the registered image. In the related industry, support vector machines are considered as having the highest capability of generalized learning in the field of pattern recognition.

A face recognition system which solves the problem of properly selecting feature points or features used for personal identification using statistical learning as described above is advantageous in that a large number of feature points or features useful for identification are automatically selected. Further, a Gabor filter is robust against a certain degree of displacement or deformation of feature extracting points. Therefore, changes in the pose of an image to be checked included in an input image can be properly treated by preparing learning samples including some pose changes such that robust features will be selected.

However, when there is a significant change in the pose of an image to be checked, displacement of feature points may become too great to be absorbed by the robustness of a Gabor filter. When a face is identified (a person is checked) from an image, it is quite important to associate points on a registered image with the image to be checked properly in order to achieve high recognition performance.

For the purpose of associating feature points on an image to be checked having pose changes with a registered image properly, a method employing a graphic structure referred to as "elastic graph" for expanding and contracting the shape of a face has been proposed (for example, see Laurenz Wiscott, Jean-Marc Fellous, Norbert Kruger, and Christoph von der Malsburg, "Face Recognition by Elastic Bunch Graph Matching" (In Intelligent Biometric Techniques in Fingerprint and Face Recognition, CRC Press, ISBN0-8493-2055-0, Chapter 11, pp. 355-396, 1999) (Non-Patent Document 1)). According to this method, feature points are provided at nodes of a graph, and features associated with the nodes are stored in advance. The entire graph can be moved to find a position where the highest degree of matching of features takes place, and the positions of the nodes can be locally shifted to adjust the shape of the graph. Constraints can be imposed on extending and contracting amounts of branches of the graph, and it is therefore possible to absorb a difference attributable to a change in the pose of a face of interest or a personal difference without significantly departing from the shape of the face. When a person is checked, it is determined whether an image to be checked represents the same person appearing on a registered image using degrees of similarity of features at nodes of the images and displacements of the nodes from the initial positions.

One method of estimating the positions of parts of a face is the use of an AAM (Active Appearance Model). According to this method, a multiplicity of manually labeled part points (feature points) of various persons and poses are prepared in advance, and a principal component analysis is carried out on data that is a combination of the positions of the parts and images around them to learn variations of the positions of the parts and the patterns. When the position of a part is estimated from an input image, an initial position of the part is given and mapped along with a learned image around the same into a partial space. A learned variation has a higher degree of match, the smaller the distance to the partial space. Thus, a part position having a higher degree of match is calculated by changing the parameters of the mapped space minutely, whereby the corresponding part position can be identified. This technique can be regarded as a statistic model in that statistical constraints are imposed, whereas an elastic graph a described above is a two-dimensional geometrical model. Identification of a person can be normally performed by directly comparing parameters on such a partial space. The parameters include position and pattern variations.

Elastic graphs and AAMs are approaches which are essentially similar to each other only except different constraints are employed. However, those methods include no explicit step of deciding a node position at which feature is to be checked. Correspondence between feature points in different images can be more easily identified, the smaller the personal variation of the feature points. However, this is contradictory to the fact that a feature allows easier determination in actually checking differences between persons when the feature varies more significantly from person to person.

When correspondence between feature points is considered from the view point of personal identification, in the case of identification of one person, it is desirable that a successful match of a relationship between particular points of the face occurs independently of differences in the shooting situation such as differences in the pose of the face. However, a difference between corresponding points does not matter in the case of identification between different persons. Since the position of the same feature point can vary from person to person, a difference between corresponding points is rather preferable, and such a difference results in a pattern difference which is assumed to make personal identification easier.

According to the above-described methods employing an elastic graph and an AAM, the pose of a face of interest and personal differences are estimated at a time. When it is required only to check corresponding points in images of one and the same person, only the pose of the person is to be considered. When corresponding points are to be checked by estimating the pose of the face of interest only, a three-dimensional model of the shape of the face may be used.

An example of face recognition using a three-dimensional model is the method utilizing CG (computer graphics) techniques, proposed by Blanz et al. (see Volker Blanz and Thomas Vetter, "Face Recognition Based on Fitting a 3D Morphable Model", (IEEE Transaction on Pattern Analysis and Machine Intelligence, Vol. 25, No. 9, 2003) (Non-Patent Document 2), for example). According to the method, a principal component analysis (PCA) is carried out to provide a three-dimensional statistical model using three-dimensional shape data [x, y, z] of a great number of faces and textures (R, G, B) associated with the shape data obtained in advance under homogeneous illumination. An image that is close to a finally input face is synthesized by varying parameters of the three-dimensional model, pose parameters, and illumination parameters (CG techniques are used for the synthesis). The face identification itself is carried out using only the parameters of the three-dimensional model, and the identification is therefore carried out while eliminating the influence of the face pose and illumination.

There are also proposals on methods of synthesizing various faces by pasting registered frontal face images on a three-dimensional face model and adding the model with various variations in illumination and pose which can be assumed to occur in advance (see Akira Inoue, Shizuo Sakamoto, and Atsushi Sato, "Face Matching Using Partial Area Matching and Perturbative Space Method" (Proceedings of JEICE General Conference 2003) (Non-Patent Document 3), for example). A principal component analysis (PCA) is performed on all of the images to obtain partial spaces (perturbative partial spaces) that the images can occupy. The distance between an input image and the partial space of each person thus obtained is found to identify the person.

Any of the above-described methods of face recognition utilizing a three-dimensional model is characterized in that it involves synthesis of a face image which results in a considerable processing load and computational cost.

SUMMARY OF THE INVENTION

It is desirable to provide a face image processing apparatus, a face image processing method, and a computer program of high performance in which feature points or features used in identifying a person can be selected through statistical learning and in which a personal identification process can be preferably performed using the selected features in a synthetic manner.

It is also desirable to provide a face image processing apparatus, a face image processing method, and a computer program of high performance in which feature points on a registered image and an image to be checked can be accurately associated with each other to achieve high recognition performance.

The invention has been made taking the above-described needs into consideration. According to an embodiment of the invention, there is provided a face image processing apparatus selecting feature points and features used for identifying a person through statistical learning and performing a personal identification process using the selected feature points in a synthetic manner. The apparatus includes:

input means for inputting a face image detected by arbitrary face detection means;

face parts detection means for detecting the positions of face parts in several locations from the input face image;

face pose estimation means for estimating face pose based on the detected positions of face parts;

feature point position correcting means for correcting the position of each feature point used for identifying the person based on the result of estimation of face pose by the face pose estimation means; and face identifying means for identifying the person by calculating a feature of the input face image at each feature point after position correction is performed by the feature point position correcting means and checking the feature against a feature of a registered face.

A face recognition system basically involves a face detection process for detecting the position and size of a face image included in an input image, a face parts detection process for detecting the positions of principal face parts from the detected face image, and a face identifying process identifying the face image (identifying the person) by checking an image to be checked obtained by correcting the position and rotation of the face image based on the positions of the face parts against a registered image.

Face recognition systems are known, in which feature points or features to be used for identifying a person are selected through statistical learning and in which a personal identification process is performed using the selected features in a synthetic manner. Such systems are advantageous in that a great number of feature points or features useful for identification are automatically selected. Features of a face image may be extracted using a plurality of Gabor filters having directional selectivity and different frequency components. Since Gabor filters are robust against a certain degree of displacement or deformation of feature extracting positions, learning samples including some pose changes may be used such that robust feature points will be selected. Thus, a change in the pose of an image to be checked included in an input image can be accommodated.

However, when there is a significant change in the pose of an image to be checked, displacements of feature points may become too great to be absorbed by the robustness of Gabor filters. When a face is identified (a person is checked) by an image, it is quite important to associate feature points on a registered image and the image to be checked with each other properly in order to achieve high recognition performance.

Under the circumstance, in the face recognition system according to the embodiment of the invention, the pose of a face is estimated using feature points which are stable regardless of the person of interest (feature points defined for detecting face parts). Thereafter, a three-dimensional model of an average face is used to transform other feature points where differences of each person significantly appear (feature points defined for identification of a face (identification of a person)) into points in a particular pose. Personal identification is carried out by comparing features in the positions obtained by the transformation.

The face parts detection means detects face parts based on features associated with feature points which are stable regardless of the person of interest (which are susceptible to less personal differences), registered in a face parts detection dictionary. The face pose estimation means estimates face pose based on the positions of the detected face parts. The feature point position correcting means corrects the positions of feature points read from an identification dictionary for personal identification according to the estimated face pose. Thus, identification of a person can be carried out in a manner robust to changes in the pose of the face.

Specifically, the face pose estimation means corrects rotation of the face image by rolling it in a screen such that the positions of the left and right eyes detected as face parts are aligned horizontally. Thereafter, the face pose estimation means estimates the angles of rotations about pitch and yaw axes included in the face image obtained by rolling the image based on a relationship between the positions of face parts detected by the face parts detection means and an average three-dimensional face model. The feature point position correcting means corrects the position of each feature point used for identifying the person based on the angles of rotations of the face image about the pitch and yaw axes estimated by the face pose estimation means.

The face parts detection means detects face parts based on features associated with feature points which are less susceptible to individual differences from person to person. Thus, when feature points on different images are associated with each other using, feature points which are less susceptible to personal differences are used. Therefore, feature points on a registered image and an image to be checked can be properly associated with each other. Meanwhile, the face identifying means identifies a person based on features at feature points where personal differences significantly appear. That is, a person can be accurately identified because personal differences are actually checked using feature points where features vary from person to person.

According to a second embodiment of the invention, there is provided a computer program described in a computer-readable form to cause a computer to execute face image processing in which feature points and features used for identifying a person are selected through statistical learning and in which a personal identification process is performed using the selected feature points in a synthetic manner. The program causes the computer to serve as:

input means for inputting a face image detected by arbitrary face detection means;

face parts detection means for detecting the positions of face parts in several locations from the input face image;

face pose estimation means for estimating face pose based on the detected positions of face parts;

feature point position correcting means for correcting the position of each feature point used for identifying the person based on the result of estimation of face pose by the face pose estimation means; and face identifying means for identifying the person by calculating a feature of the input face image at each feature point after position correction is performed by the feature point position correcting means and checking the feature against a feature of a registered face.

The computer program according to the second embodiment of the invention is a computer program described in a computer-readable form to implement a predetermined process on a computer. In other words, when the computer program according to the second embodiment of the invention is installed in a computer, the program demonstrates a cooperative effect on the computer to achieve advantages similar to those of the face image processing apparatus according to the first embodiment of the invention.

According to the embodiments of the invention, it is possible to provide a face image processing apparatus, a face image processing method, and a computer program which are advantageous in that feature points and features to be used to identify a person can be selected through statistical learning and in that a personal identification process can be preferably performed using the selected features in a synthetic manner.

According to the embodiments of the invention, it is possible to provide a face image processing apparatus, a face image processing method, and a computer program which are advantageous in that feature points on a registered image and an image to be checked can be accurately associated with each other even when there is a change in the pose of the image to be checked to achieve high recognition performance.

What is important in checking a person using a face image is how to associate feature points on an image to be checked and a registered image with each other. In the face image processing apparatus according to the embodiment of the invention, the pose of the face is estimated using feature points which are stable regardless of the person of interest. Thereafter, other feature points where significant personal differences appear are transformed into a particular pose using a three-dimensional model of an average face. Feature points at positions obtained by such a transformation are compared to identify the person. It is therefore possible to check a person in a manner robust to changes in pose.

In the face image processing apparatus according to the embodiment of the invention, when feature points on different images are associated with each other, feature points which are less susceptible to personal differences are used. Therefore, feature points on a registered image and an image to be checked can be properly associated with each other. Meanwhile, personal differences are actually checked using feature points where features vary from person to person. Therefore, a person can be identified with a high accuracy.

As thus described, in the face image processing apparatus according to the embodiment of the invention, feature points for estimating pose are treated separately from feature points for identification. Therefore, identification of a person can be carried out with high performance, and the advantage of statistic selection of features required for identification can be preferably utilized.

In the face image processing apparatus according to the embodiment of the invention, a three-dimensional average face model is used for estimating the pose of a face image, and no complicated process such as image synthesis is performed. Therefore, a face identifying process can be performed at a high speed and a low computational cost.

Other features and advantages of the invention will become apparent from the more detailed description of the invention provided below based on an embodiment of the invention and the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3D shows eight Gabor filters obtained by applying the filter window to response functions in eight directions at equal angular offsets of 22.5 deg each;

DESCRIPTION OF THE PREFERRED EMBODIMENTS

Embodiments of the invention will now be described with reference to the drawings.

Figure 1:
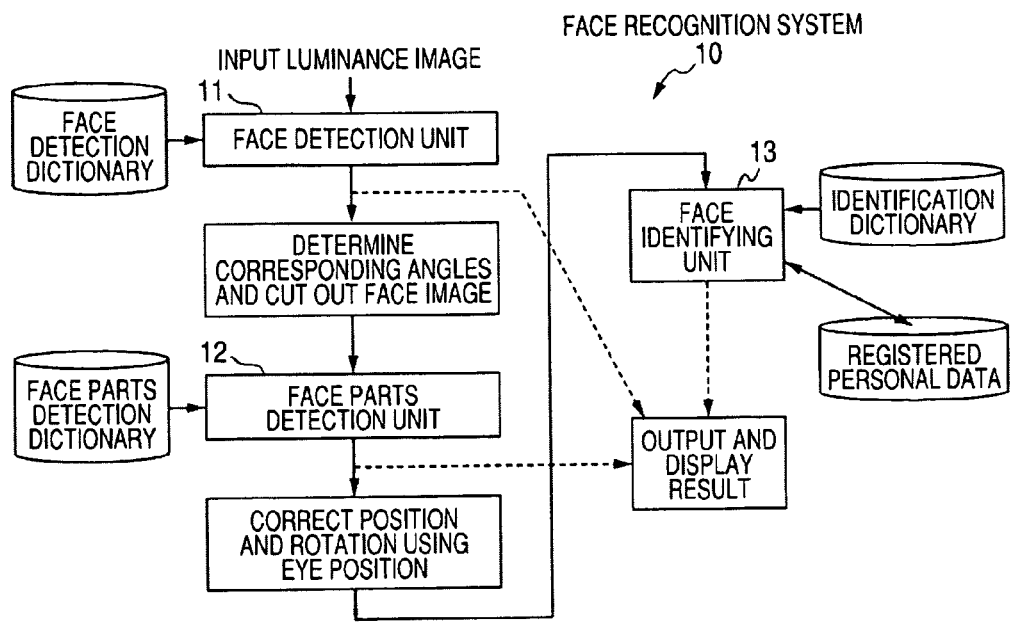
FIG. 1 schematically shows an overall configuration of a face recognition system according to an embodiment of the invention.

FIG. 1 schematically shows a general configuration of a face recognition system according to an embodiment of the invention. A face recognition system 10 in the illustration includes a face detection unit 11, a face parts detection unit 12, and a face identifying unit 13.

The face detection unit 11 detects a face from an input image and finds the size and position of the detected face. Extraction of features involved in the face detection may be performed using a two pixel difference method. According to the method, calculation of a luminance difference between pixels at two points where face features can be easily extracted from a range of pixels having a predetermined size, and the calculation is performed for various pairs of such points. For example, Adaboost algorithm may be used for classifier calculations. Adaboost is a theory proposed by Freund et al in 1996 that "a strong classifier" can be constructed by combining a multiplicity of "weak classifiers slightly better than random classifiers" (also referred to as "weak learners (WL)". Specifically, a plurality of combinations of pixels are selected at pairs of points which are considered as having luminance differences that facilitate extraction of features of a face. For each of the combinations, a weak hypothesis is defined for the luminance difference between the pixels at the two points, and a final hypothesis is defined based on weak hypotheses statistically learned in advance. A face detector is formed by a set of weak hypotheses for the two-pixel luminance differences and is registered as a face detection dictionary. Detection proceeds as follows. The face detector, which has a predetermined size in pixels, is scanned within an input image region, and the detector performs calculations at each position scanned to obtain a luminance difference between each pair of pixels for which a weak hypothesis has been defined. The calculation results are scored according to the degree of their conformance with the weak hypotheses, and the sum of such scores for all pairs of pixels for which a weak hypothesis has been defined constitutes a final hypothesis to be used for determination on whether the scanned position is the position of an eye or not. Each of the weak classifiers is generated such that a weight α is given to the item that is poorly classified by the weak classifier generated immediately before the classifier of interest. The reliability of each weak classifier is obtained from the degree of certainty of its classification, and a majority decision is made based on the reliability. For example, a face detection method using a two-point pixel difference method is also disclosed in JP-A-2005-157679 which has already been assigned to the present applicant.

To obtain an aligned (normalized) face for face identification, the positions of facial parts such as the left and right eyes, the nose tip, the center of the mouth are detected using the higher resolution image of a face detected by the face detection unit 11. Based on the detected eye positions, the size, position, and angle of the face having an improved resolution are obtained from the size and position of the face image obtained by face detection. The two-point pixel difference method may be used for extraction of features involved in the detection of the eye positions. Adaboost algorithm may be used for classifier calculations.

The face identifying unit 13 identifies the size, position, and angle of the face from the face image on which the positions of the left and right eyes have been identified through the eye position detection. The face is aligned into a predetermined size in pixels accordingly and is temporarily stored in an internal SRAM (not shown) to check whether the face matches a registered image.

The face identifying unit 13 employs Gabor filtering to extract features to be used for face identification. Gentle boost algorithm is used for classifier calculations. Results obtained by applying a Gabor filter to the aligned face image are compared with results obtained by applying a Gabor filter to the image registered in advance to find the degree of similarity between them. Gentle boost algorithm is applied to the degree of similarity thus found to check whether the face image matches the registered image.

Statistical data required for each of the face detection unit 11, the face parts detection unit 12, and the face identifying unit 13 (specifically, a face detection dictionary 21, a face parts detection dictionary 22, and an identification dictionary 23) are learned in advance from a great amount of face data and samples. Features associated with feature points which are stable regardless of the person of interest (or less susceptible to individual variation) are registered in the face detection dictionary 21 and the face parts detection dictionary 22. On the contrary, features at feature points at which significant individual variation can appear are registered in the face identification dictionary.

Figure 2:
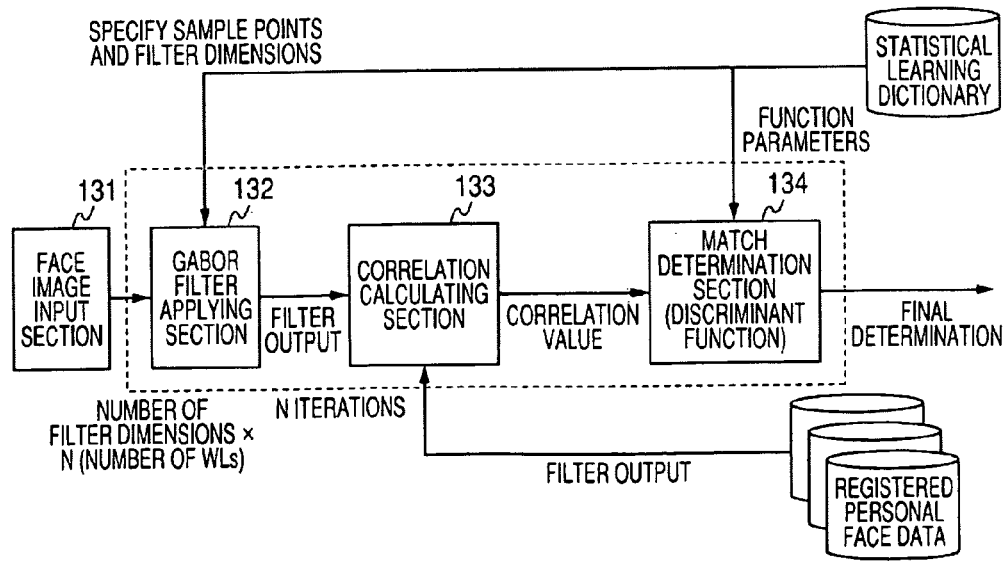
FIG. 2 schematically shows an internal configuration of a face identifying unit 13.

FIG. 2 schematically shows an internal configuration of the face identifying unit 13. The illustrated face identifying unit 13 includes a face image input section 131, a Gabor filter applying section 132, a correlation calculating section 133, and a match determination section 134.

The face image input section 131 transfers a face image having a resolution required for face recognition obtained based on the position of each part of the face, e.g., the eyes of the face, detected by the face parts detection unit 12 to a local memory (not shown) of the face identifying unit 13. The size, position, and angle of the face are obtained from position information of the face parts such as the eyes to align the face image. Thus, a face image required for face recognition is created. That is, the face image input section 131 reduces, shifts, and rotates the face image to align the right and left eyes with fixed coordinates based on the position information of the face parts such as the eyes, whereby the face image required for face recognition is created.

The Gabor filter applying section 132 applies Gabor filters to the face image aligned by the image input section 131.

Figure 3A:
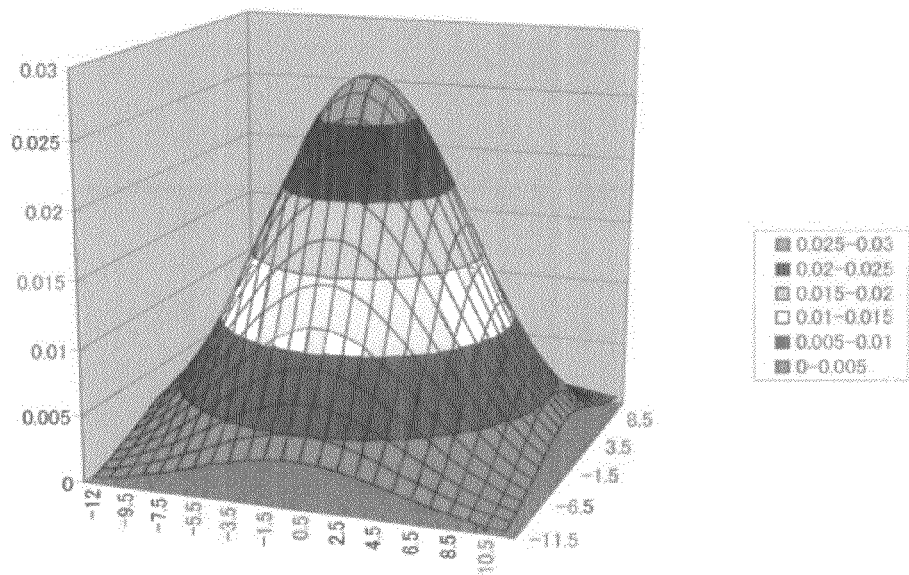
FIG. 3A shows a filter window employing a Gaussian function formed in a fixed size in pixels.
Figure 3B:
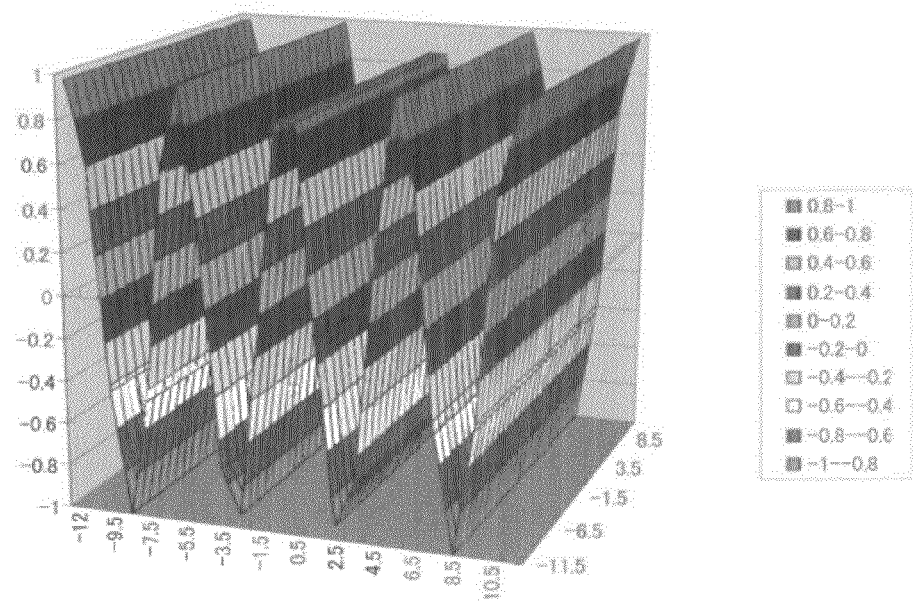
FIG. 3B shows a response function that is a sine function or a cosine function.
Figure 3C:
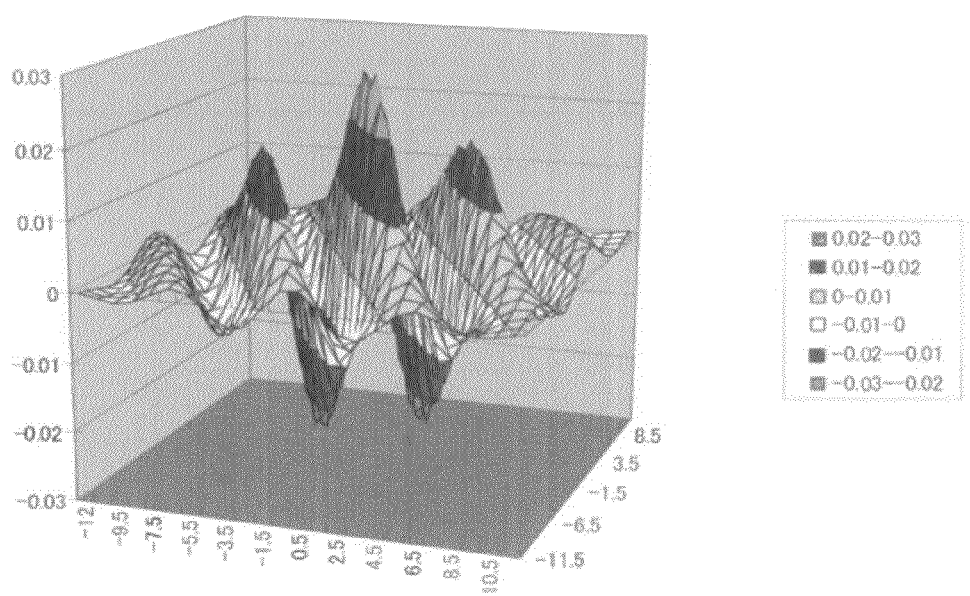
FIG. 3C shows a Gabor filter obtained by applying the filter window shown in FIG. 3A to the response function shown in FIG. 3B.
Figure 3E:
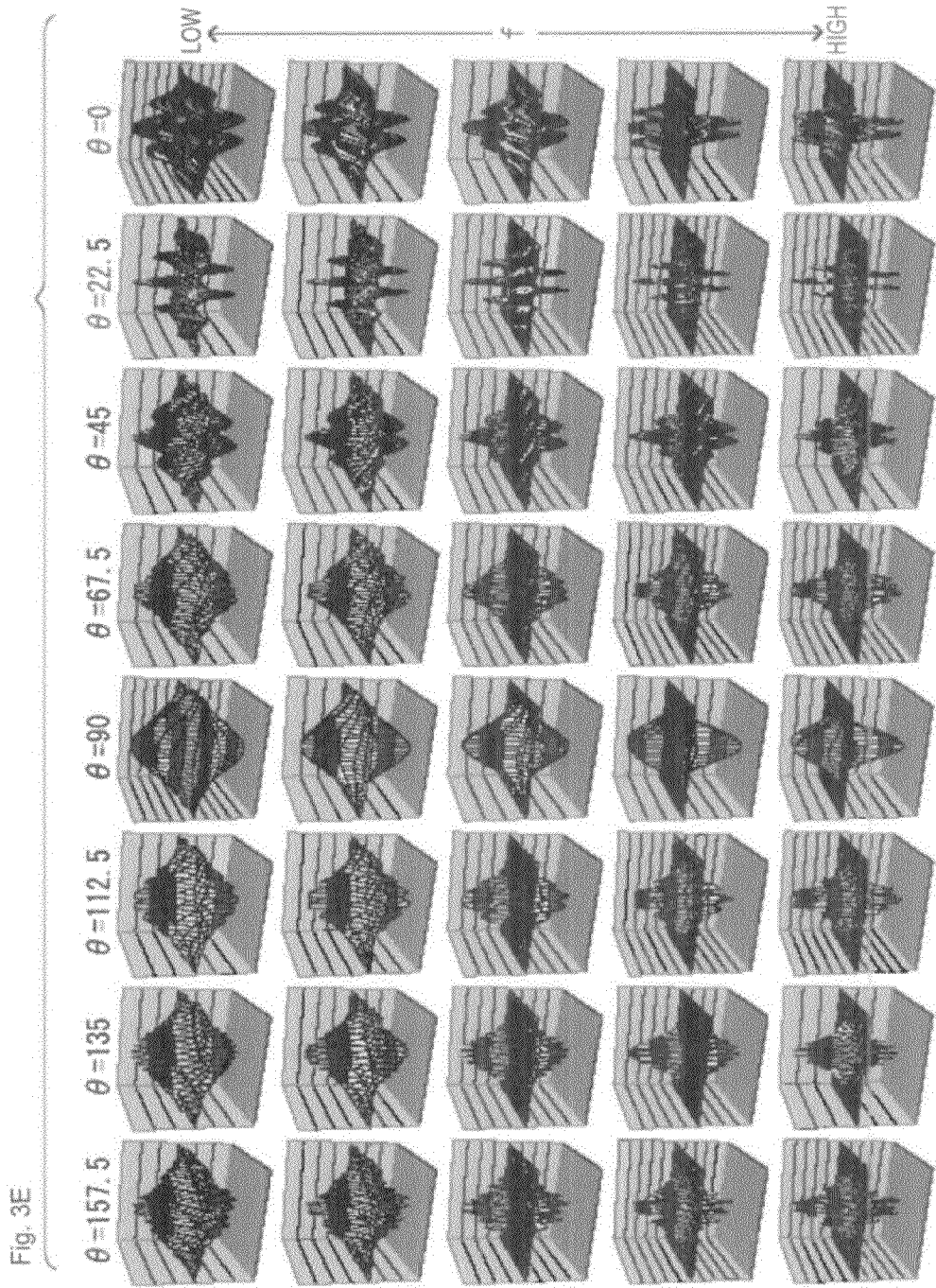
FIG. 3E shows forty types of Gabor filters obtained by applying the filter window to response functions of five different frequencies f at angles θ defining eight directions.

A Gabor filter is spatially represented using a Gaussian function as a window and a Gabor function whose base is a sine function or a cosine function as frequency response. For example, the filter window is fixed at 24×24 pixels as shown in FIG. 3A. When the filter window is applied to a response function which is a sine function or cosine function of a particular frequency component as shown in FIG. 3B, a Gabor filter as show in FIG. 3C can be created. For example, when the filter window is applied to each of response functions which are sine functions or cosine functions in eight directions at equal angular offsets of 22.5 deg each, i.e., directions at 0 deg, 22.5 deg, 45 deg, 67.5 deg, 90 deg, 112.5 deg, 135 deg, and 157.5 deg, eight Gabor filters can be created as shown in FIG. 3D. Further, when the filter window is similarly applied to response functions of five different frequencies f ranging from a low frequency band to a high frequency band at angles θ defining eight directions, forty types of Gabor filters are formed in total as shown in FIG. 3E. A Gabor filter (Gabor kernel K(x, y)) is given by the following expression.

$$K(x, y) = \frac{f}{2\pi} \exp\left( -\frac{f^2}{2}(x^2 + y^2) \atop (\sin 2\theta + \cos 2\theta) \right) \left\{ \exp\left( i 2\pi f \left( {x \sin \theta + \atop y \sin \theta} \right) \right) - \exp\left( -\frac{1}{2f^2} \right) \right\} \quad (1)$$

$$\text{gauss}(x, y) = \frac{f}{2\pi} \exp\left( -\frac{f^2}{2}(x^2 + y^2) \right)$$

$$\text{Re}(x, y) = \cos(2\pi f(x\cos\theta + y\sin\theta))$$

$$\text{im}(x, y) = \sin(2\pi f(x\cos\theta + y\sin\theta))$$

$$x, y = -11.5, -10.5, -9.5, \ldots, -1.5, -0.5, 1.5, \ldots, 9.5, 10.5, 11.5$$

Referring to the calculation of a Gabor filter, a Gabor filter Gi(x, y) is calculated by convolving the pixel I (x, y) to which the Gabor filter is applied and a coefficient of the Gabor filter. A Gabor filter coefficient can be separated into a real part Re(x, y) whose frequency response is a cosine function and an imaginary part Im(x, y) whose frequency response is a sine function. A convolution calculation is performed on those parts to synthesize respective components. Thus, a Gabor filtering result Ji(x, y), which is one scalar value, can be obtained where (x, y) represents the pixel position in which a feature is extracted and where "i" indicates that the filter of interest is the i-th Gabor filter of the above-described forty Gabor filters.

$$J_i(x, y) = G_i(x, y) \otimes I(x, y) \quad (2)$$

A set of scalar values $\{J_1, J_2, \ldots, J_{40}\}$, i.e., a set of forty scalar values at the maximum, obtained by using forty types of Gabor filters at the maximum in a feature extracting position (x, y) of an image is referred to as "Gabor jet", The correlation calculating section 133 performs a normalized correlation calculation on Gabor jets GS calculated on an input image and Gabor jets GR of a registered image to correlate the image to be checked and the registered image, whereby the degree d of similarity between the images is obtained in each feature extracting position.

$$d = \frac{GS \cdot GR}{|GS||GR|} \quad (3)$$

The normalized correlation calculation is performed on the face images having aligned pixels at a multiplicity of feature extracting positions or feature points which are considered as allowing easy extracting of features, whereby degrees of similarity are obtained. As a result, a similarity degree vector D whose elements are normalized correlation calculation results $d_0, d_1, \ldots$ extracted at the feature points is obtained.

$$D=(d_0, d_1, d_2, \ldots) \quad (4)$$

It is stated above that forty types of Gabor filters are used "at the maximum", and the statement means that it is not required to use all of the forty types of Gabor filters at all defined feature points. The number of Gabor filter types to be used at a feature extracting point where a degree of similarity is extracted depends on the location of the point. That is, the types and number of Gabor filters (the number of the elements of a Gabor jet) depend on the location of interest.

The match determination section 134 determines a whether the images match each other based on the similarity degree vector obtained between the input image and the registered image. In the present embodiment, Gentleboost is used for classifier calculations. Gentleboost calculations are performed using the following expression. The values a, q, and b in the expression are registered in the identification dictionary in advance.

$$y000 = a000 \times (dj000 > q000) + b000 \quad (5)$$
$$y001 = a001 \times (dj001 > q001) + b001$$
$$y002 = a002 \times (dj002 > q002) + b002$$
$$\ldots \quad \ldots \quad \ldots$$
$$y159 = a159 \times (dj159 > q159) + b159$$
$$0 \leq j000, j001, j002, \ldots, j159 \leq 81$$

It is determined whether the input image and the registered image match each other according to the following discriminant.

$$\text{if } ((y000+y001+y002+\ldots+y159) > \text{threshold}) \text{ face } OK$$
$$\text{else face } NG \quad (6)$$

Although Gentleboost is used for the determination of a match in the above description, the invention is not necessarily limited to the same. For example, values at the border of the similarity vector may be classified using a support vector machine to determine the match of the images.

Steps of the process at the face identifying unit 13 can be generally summarized as follows.

Step 1: A face image located and cut out by the face parts detection unit 12 is passed.

Step 2: The position of a feature point and the types (dimensions) of the Gabor filters used are read from the identification dictionary which has been statistically learned. Gabor filter calculations are performed on the image based on the read information to obtain a filter output.

Step 3: Data of persons to be checked are sequentially read from personal face data registered in advance (records of results of Gabor filter calculations performed on registered faces), and correlation between the data and the filter out of the input image is calculated.

Step 4: Personal identification is performed based on a correlation value thus obtained using a discriminant function read from the statistically learned dictionary.

Step 5: The process returns to step 2 to repeat the steps up to step 4 N times (N equals the number of the weak learners WL).

Step 6: Results of N rounds of determination are integrated to output a final determination.

As described above, the face recognition system 10 of the present embodiment basically selects feature points or features to be used for personal identification through statistical learning and performs a determination process in a determination process in a comprehensive manner using features at the selected feature points.

The Gabor filters used for extracting features are robust against some degree of displacement or deformation of feature points at which features are extracted. Therefore, changes in the pose of an image to be checked included in an input image can be accommodated by including some pose changes in learning samples such that robust feature points will be selected.

However, when there is a significant change in the pose of an image to be checked, displacements of feature points may become too great to be absorbed by the robustness of Gabor filters. When a face is identified, it is quite important to establish correspondence between feature points on a registered image and the image to be checked properly in order to achieve high recognition performance.

Under the circumstance, in the face recognition system 10 of the present embodiment, the pose of a face is estimated using feature points which are stable regardless of the person of interest (feature points defined for detecting face parts). Thereafter, a three-dimensional model of an average face is used to transform other feature points where differences of each person significantly appear (feature points defined for identification of a face (personal identification) into points in a particular pose. Personal identification is carried out by comparing features in the positions reached after the transformation.

The face parts detection unit 12 detects parts of the face based on features associated with the feature points which remain stable regardless of personal differences (the feature points which are susceptible to less individual variation) registered in the face parts detection dictionary 22. When feature points on different images are associated with each other, feature points subjected to less personal variation are used. It is therefore possible to associate feature points on a registered image and an image to be checked properly. Subsequently, the pose of the face is estimated using the association between feature points detected from the face image and the respective feature points on the average three-dimensional model of a face. A process of checking the face image is performed after correcting the positions of the feature points read from the identification dictionary 23 accordingly. The personal identification can be carried out in a manner that is robust to changes in the pose of the face of interest.

The operation of adaptively changing the coordinates of feature points (which can significantly vary from person to person) read from the identification dictionary 23 will be referred to as "adaptive sampling" in the present specification.

Adaptive sampling includes the following steps.

Step 11: Detection of Face Parts

Step 12: Estimation of Face Pose (12-1) Feature points are rolled in the screen to correct them such that the eyes will be horizontally aligned.

(12-2) Yaw angles and pitch angles having their origin in the middle point between the eyes are estimated from a relationship between standard models of the face parts and the face parts detected from the input image.

Step 13: A region of the face is cut out based on an estimated angle and an estimated scale.

(13-1) The center and four corners of the face region in the input image are calculated.

(13-2) The image is rotated about the center of the region.

(13-3) The rotated image is sliced and aligned into a predetermined size in pixels.

Step 14: Sampling points are corrected based on the pose angle.

(14-1) The defined sampling points (x, y, z) having their origin in the middle point between the eyes are rotated about pitch and yaw axes in the listed order of the axes.

Each of the steps of adaptive sampling will now be described in detail.

Detection of Face Parts

Figure 4:
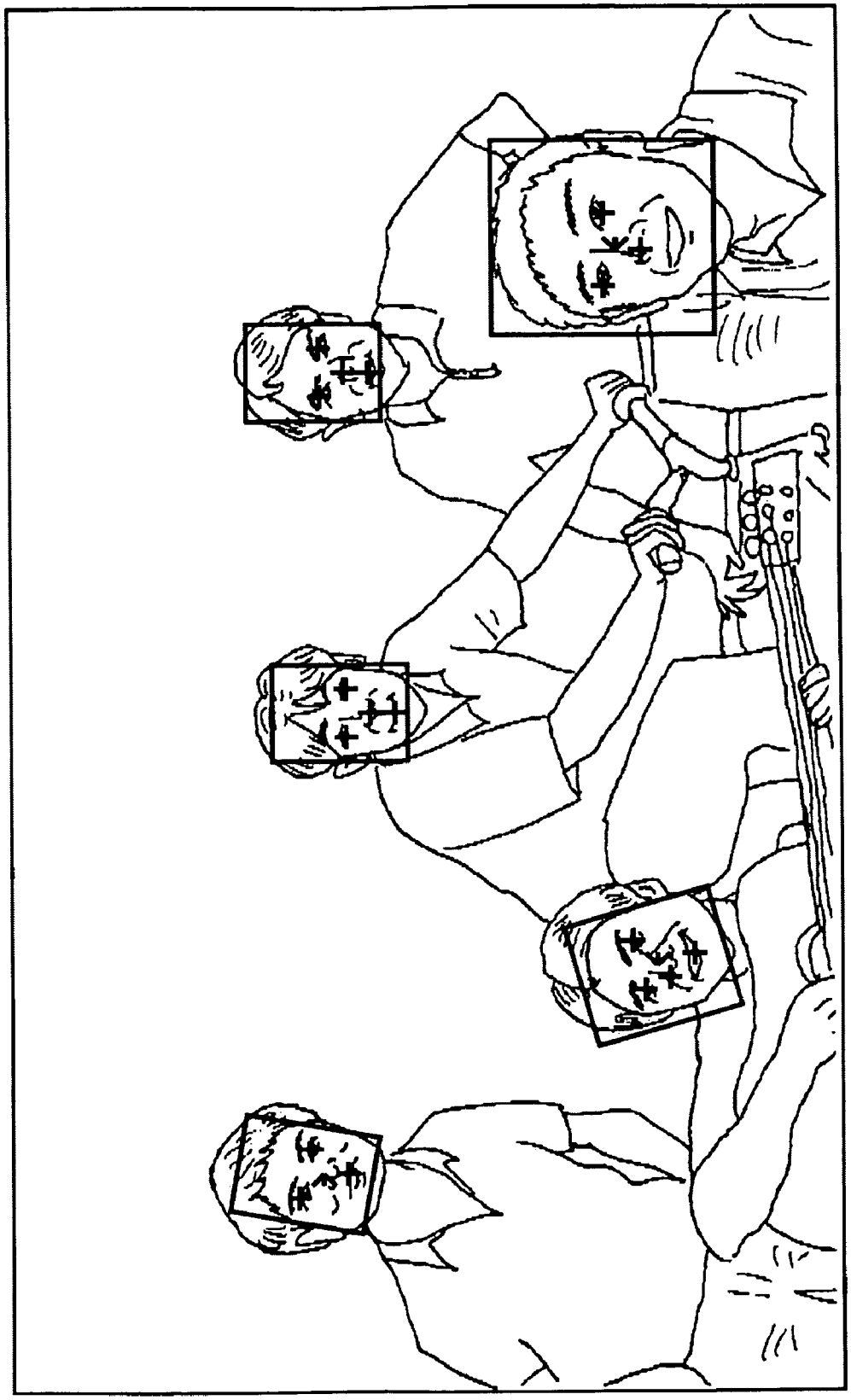
FIG. 4 shows an example of a result of detection of faces and face parts (four points, i.e., the centers of eyes, the nose tip, and the center of the mouth)

FIG. 4 shows an example of a result of detection of faces and face parts (four parts in the illustrated example, i.e., the centers of the eyes, the nose tip, and the center of the mouth). The detection of faces can be carried out by scanning all face patterns from in an image. Face parts can be detected by scanning a predetermined area in each of the detected face regions to find patterns of the face parts, i.e., the right eye, the left eye, the nose tip, and the center of the mouth.

Figure 5A:
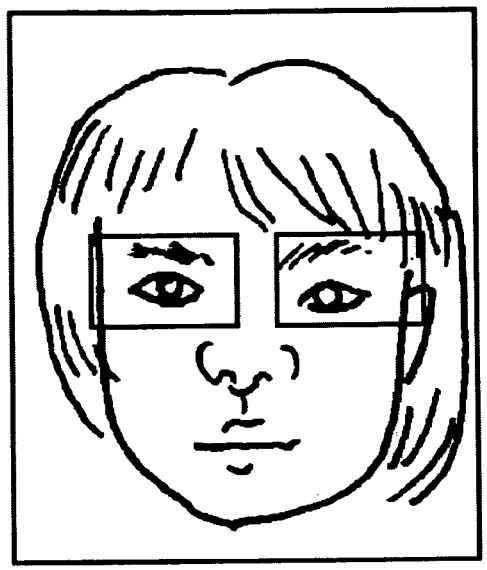
FIG. 5A shows how a search area is shifted upward, downward, leftward, and rightward during normal detection of face parts.
Figure 5B:
FIG. 5B shows how the search area for face parts detection is shifted upward, downward, leftward, and rightward based on a result of estimation of an pose angle of a face.
Figure 5B:

The face parts detecting process may include a function of roughly estimating the pose angle of a face from a plurality of face detection results which are in an overlapping relationship. Even when it is difficult to detect face parts because of significant changes in the pose of the face, the use of the pose angle estimating function allows face parts to be detected with stability by shifting a search area for face parts detection upward, downward, leftward, and rightward in accordance with an estimated pose angle of the face, as shown in FIG. 5B. When a face detected by the face detection unit 12 faces forward, only one search area as shown in FIG. 5A is normally sufficient for the purpose of detection.

Estimation of Face Pose

Figure 6:
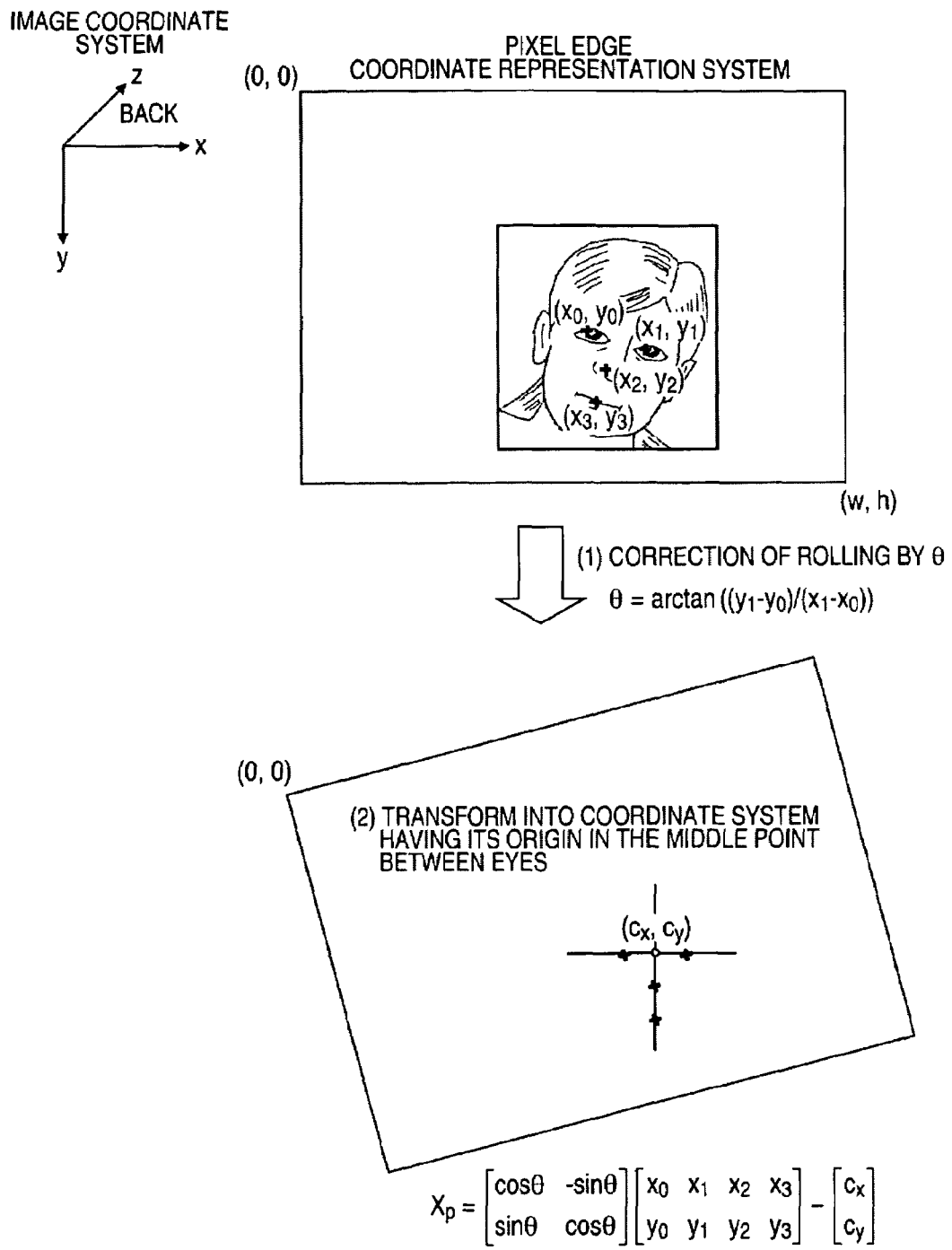
FIG. 6 shows assignment of coordinates $(x_0, y_0)$, $(x_1, y_1)$, ... to feature points of each face part in an image using a pixel edge coordinate representing system whose origin is the top left corner of the top left pixel of the image, the figure also showing rotation of a face image at an angle θ about an appropriate point such that the eyes are aligned horizontally.

When the detection of face parts is completed, feature points of each face part are given coordinates $(x_0, y_0)$, $(x_1, y_1)$, ... in the image using a pixel edge coordinate representing system whose origin is the top left corner of the top left pixel of the image (see FIG. 6). Rotation is corrected in a rolling direction at an angle θ around an appropriate point such that the eyes will be horizontally aligned. The angle of rotation θ is given by Expression 7 shown below.

$$\theta = \arctan((y_1 - y_0)/(x_1 - x_0)) \quad (7)$$

The coordinates are further transformed into a coordinate system whose origin is the middle point between the eyes. The resultant coordinates are given by Expression 8 shown below in which $X_p$ represents the coordinates.

$$X_p = \begin{bmatrix} \cos\theta & -\sin\theta \\ \sin\theta & \cos\theta \end{bmatrix} \begin{bmatrix} x_0 & x_1 & x_2 & x_3 \\ y_0 & y_1 & y_2 & y_3 \end{bmatrix} - \begin{bmatrix} c_x \\ c_y \end{bmatrix} \quad (8)$$

where $(x_0, y_0)$, $(x_1, y_1)$, $(x_2, y_2)$, and $(x_3, y_3)$ represents the coordinates of the left eye, the right eye, the nose tip, and the center of the mouth, respectively. As a result of the coordinate transformation given by Expression 8, the estimation of the face pose requires only angles p and y of rotation around pitch and yaw axes and s scaling value s for fitting (or aligning) the size of the face image to the registered image.

Figure 7A:
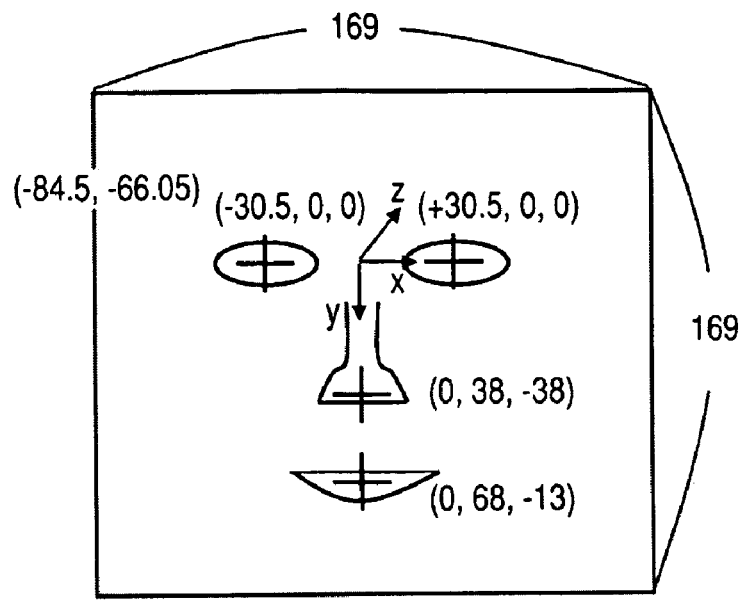
FIG. 7A shows a three-dimensional positional relationship between average face parts.
Figure 7B:
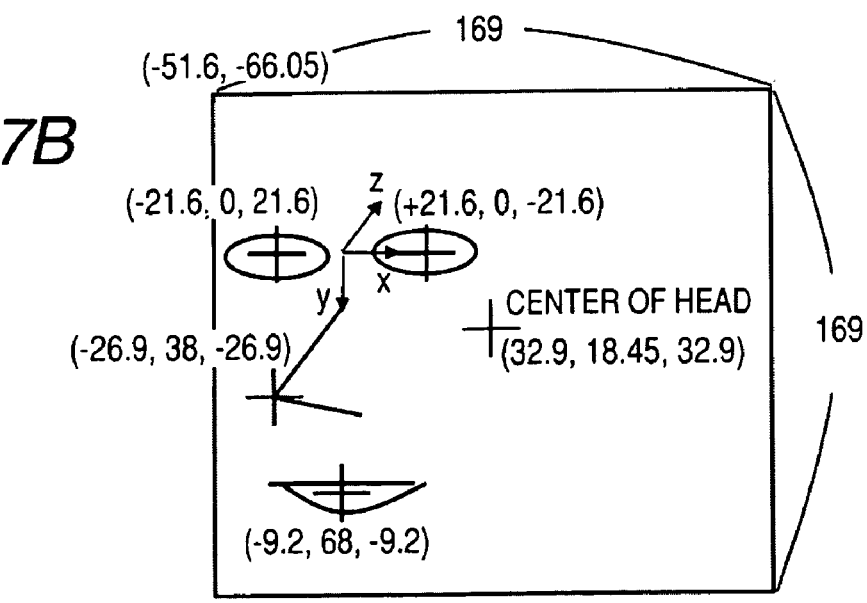
FIG. 7B shows a three-dimensional positional relationship which the average face parts shown in FIG. 7A enter when they are rotated by 45 deg about a yaw axis.

A three-dimensional positional relationship between average face parts is defined (in mm) as shown in FIG. 7A where the middle point between the eyes serves as the origin as described above. A relationship between the face parts and the face frame used for cutting out the face is also defined in FIG. 7A. FIG. 7B shows a three-dimensional positional relationship which the average face parts shown in FIG. 7A enters when they are rotated at 45 deg about the yaw axis.

A description will now be made on steps of a process of converting (aligning) the pose angle and scale of a face in an input image based on the coordinates of input face parts (feature points) in the image and definitions of average face parts positions.

Step 21: The feature points in the input image are transformed into coordinates $X_p$ whose origin is the middle point between the eyes (as described above) with the eyes aligned horizontally.

Step 22: The three-dimensional positions of the feature points of the average face model shown in FIG. 7A are represented by a matrix $X_m$ as shown below. The first to fourth columns of the matrix $X_m$ shown below correspond to the three-dimensional positions of the right eye, the left eye, the nose tip, and the mouth, respectively.

$$X_m = \begin{bmatrix} -30.5 & +30.5 & 0.0 & 0.0 \\ 0.0 & 0.0 & 38.0 & 68.0 \\ 0.0 & 0.0 & -38.0 & -13.0 \end{bmatrix} \quad (9)$$

Step 23: In the coordinate representation of the average face model shown in FIG. 7A, a rotation about the x-axis is referred to as a pitch p, and a rotation about the y-axis is referred to as a yaw y. A rotation matrix R representing coordinate transformation of the four feature points, i.e., the right eye, the left eye, the nose tip, and the mouth, as a result of those rotations is given by the following expression.

$$R \equiv \begin{bmatrix} \cos(y) & \sin(y)\sin(p) & \sin(y)\cos(p) \\ 0 & \cos(p) & -\sin(p) \end{bmatrix} \quad (10)$$

Step 24: The coordinates $X_p$ of the feature points in the input image and the coordinates $X_m$ of the average face model have the same origin, and rolls about the z-axis have already been corrected. Therefore, those coordinates enter a relationship represented by the following expression when the scaling value s and the yaw and pitch rotation transformation R is applied.

$$X_p = sRX_m \begin{bmatrix} x_{p\_x} \\ x_{p\_y} \end{bmatrix} \quad (11)$$

$$= s \begin{bmatrix} \cos(y) & \sin(y)\sin(p) & \sin(y)\cos(p) \\ 0 & \cos(p) & -\sin(p) \end{bmatrix} \begin{bmatrix} X_{m\_x} \\ X_{m\_y} \\ X_{m\_z} \end{bmatrix}$$

It is assumed here that the model points are orthogonally projected on the input image. $X_{p\_x}$ and $X_{p\_y}$ represent the x-coordinate and y-coordinate of a feature point in the input image, respectively. $X_{m\_x}$, $X_{m\_y}$, and $X_{m\_z}$ represent x-, y-, and z-coordinates, respectively, into which a feature point of the model is decomposed.

Step 25: The second row of the matrix calculation shown in Expression 11 has only the rotation p about the pitch axis as a parameter, and it can therefore be transformed as follows.

$$x_{p\_y}^T = [X_{m\_y}^T - X_{m\_z}^T] \begin{bmatrix} s\cos(p) \\ s\sin(p) \end{bmatrix} \quad (12)$$

Step 26: Expression 13 shown below is obtained by solving Expression 12 using a pseudo-inverse matrix.

$$B = \lfloor X_{m\_y}^T - X_{m\_z}^T \rfloor \quad (13)$$

$$\begin{bmatrix} a_x \\ a_y \end{bmatrix} \equiv \begin{bmatrix} s\cos(p) \\ s\sin(p) \end{bmatrix} = (B^T B)^{-1} B^T x_{p\_y}^T$$

$(B^T B)^{-1} B^T$ in Expression 13 can be obtained from the matrix $X_m$ representing the three-dimensional positions of the feature points of the average face model. Therefore, $(B^T B)^{-1} B^T$ may be calculated in advance using Expression 9 at an off-line process to omit the inverse matrix calculation when the process is performed on line.

Step 27: the angle of rotation p of the face image about the pitch axis can be obtained from Expression 14 shown below based on the result of calculation of Expression 13.

$$p = \arctan(a_y / a_x) \quad (14)$$

Step 28: Referring to the first row of Expression 11, the angle of rotation y of the face image about the yaw axis can be obtained from the following expression.

$$x_{p\_x} = [X_{m\_x}^T \sin(p) X_{m\_y}^T + \cos(p) X_{m\_z}^T] \begin{bmatrix} s\cos(y) \\ s\sin(y) \end{bmatrix} \quad (15)$$

Step 29: Since the pitch angle p has already been obtained by Expression 14, Expression 15 is solved using a pseudo-inverse matrix just as done for Expression 13, and the following expression is obtained.

$$D = \lfloor X_{m\_y}^T \sin(p) X_{m\_y}^T + \cos(p) X_{m\_z}^T \rfloor \quad (16)$$

$$\begin{bmatrix} b_x \\ b_y \end{bmatrix} \equiv \begin{bmatrix} s\cos(y) \\ s\sin(y) \end{bmatrix} = (D^T D)^{-1} D^T x_{p\_x}^T$$

Step 30: Thus, the angle of rotation y of the face image about the yaw axis can be obtained from the following expression.

$$y = \arctan(b_y / b_x) \quad (17)$$

Step 31: Expressions 14 and 14 are averaged to obtain a scaling value s as given by the following expression.

$$s = \frac{\text{hypot}(a_y, a_z) + \text{hypot}(b_y, b_z)}{2} \quad (18)$$

Expression 15 which obtained by referring to the first row of Expression 11, to find the angle of rotation y of the face image about the yaw axis may be transformed as shown below.

$$x_{p\_x} = [X_{m\_x}^T \quad X_{m\_y}^T \quad X_{m\_z}^T] \begin{bmatrix} 1 & 0 & 0 \\ 0 & \cos(p) & \sin(p) \\ 0 & -\sin(p) & \cos(p) \end{bmatrix} \begin{bmatrix} s\cos(y) \\ 0 \\ s\sin(y) \end{bmatrix} \quad (19)$$

$$x_{p\_x} = X_m^T R_{3p} v_{3Y}$$

where $$X_m^T = \lfloor X_{m\_x}^T \quad X_{m\_y}^T \quad X_{m\_z}^T \rfloor$$

-continued $$R_{3p} = \begin{bmatrix} 1 & 0 & 0 \\ 0 & \cos(p) & \sin(p) \\ 0 & -\sin(p) & \cos(p) \end{bmatrix}$$

$$v_{3Y} = \begin{bmatrix} s\cos(y) \\ 0 \\ s\sin(y) \end{bmatrix}$$

In this case, the expression to find the yaw angle may be expressed as follows.

$$v_{3Y} = R_{3p}^{-1} (X_M X_M^T)^{-1} X_M x_{p\_x} \quad (20)$$

where $$R_{3p}^{-1} = \begin{bmatrix} 1 & 0 & 0 \\ 0 & \cos(p) & -\sin(p) \\ 0 & \sin(p) & \cos(p) \end{bmatrix}$$

$(X_m X_m^T)^{-1} X_m$ on the right side of Expression 20 may be obtained from expression 9 in advance (or at an off-line process). Therefore, According to Expression 20, an inverse matrix calculation can be omitted at the off-line process, and the angle of rotation y about the yaw axis can be derived using the inverse of the rotation matrix $R_{3p}$ for the pitch.

Cut-Out of Face Region

When estimates of the face image pose and the scaling value s are obtained by the face pose estimation process, the center and four corners of a face region of interest are calculated. The face images is rolled about the centers of the region, and the face region is aligned into a predetermined size in pixels (e.g. 80×80 pixels) based on the scaling value s and cut out.

Figure 8:
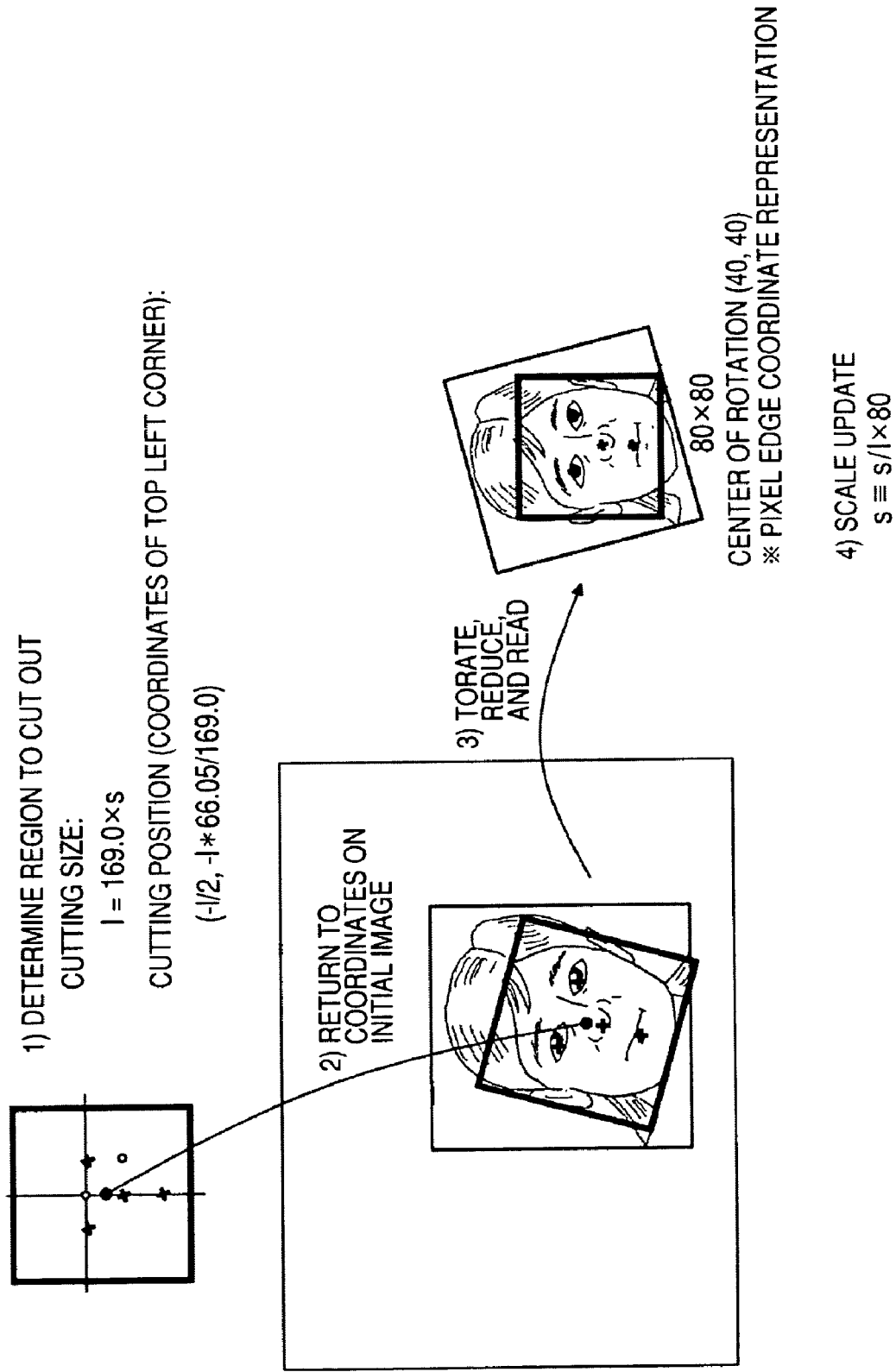
FIG. 8 shows a process of cutting out a face region.

FIG. 8 shows a process of cutting out a face region.

A face region is defined using a model obtained through the face pose estimation process and a scaling value s for input coordinates. A face region on an average face model has a size of 169.0, and the size multiplied by the scaling value s becomes the size of a face region in an image. A cutting position can be calculated from the position of the position from the origin of the average face model.

Since the coordinates $X_p$ of feature points of face parts have been rolled to align the eyes in the horizontal direction, the image is rotated this time to be made horizontal, and a rectangular region is cut out from the image.

Finally, the image is aligned into a predetermined size (e.g., 80×80 pixels) to be used for recognition. At this time, the scaling value is also updated to allow transformation into the size of 80×80 pixels.

Figure 9A:
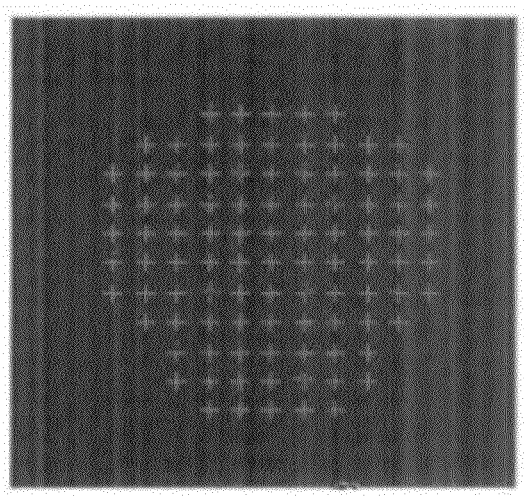
FIG. 9A shows an example of candidates of feature points selected through statistical learning (a front view)
Figure 9B:
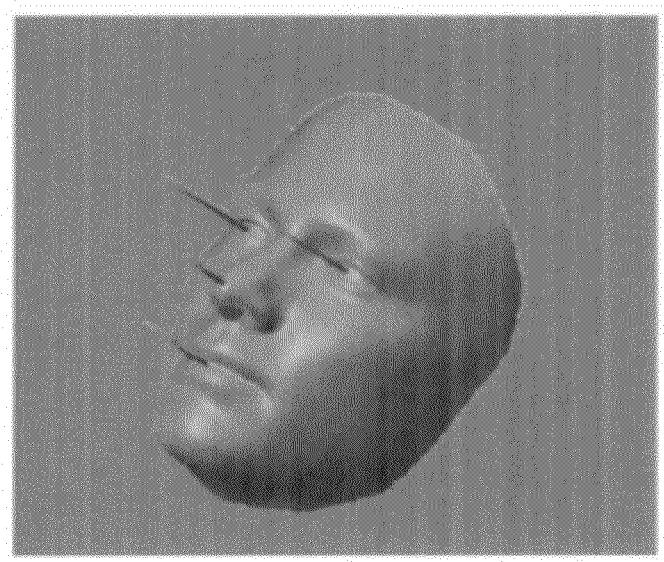
FIG. 9B shows an example of candidates of feature points selected through statistical learning in which the z-coordinate of each grid point (a feature point used for identifying a person) is obtained in advance based on a three-dimensional average face model.

FIG. 9A shows examples of candidates of feature points selected through statistical learning. A multiplicity of candidates of feature points are selected in the form of a grid throughout a face. The grid points are aligned into an image size to be used for face recognition. In the illustrated example, 97 points are defined as feature points of a face image having 80×80 pixels, the points being selected at intervals of five pixels which are masked. FIG. 9A is a front view of the candidates, and the z-coordinate of each of the grid points (feature points used for personal identification) is obtained in advance based on a three-dimensional average face model as shown in FIG. 9B. The data of the coordinate is saved along with specifications of features used for the learning dictionary.

When the face image is actually cut out and input as an image to be checked to calculate the feature at each feature point, the coordinates of the 97 feature points read from the dictionary are corrected by rotating and scaling them based on estimated face poses p and y and an estimated scaling value s.

Let us assume that $X_s$ represents three-dimensional defined coordinates of feature points registered in the face identification dictionary and that $x_s$ represents the coordinates of the corrected feature points obtained by rotating and scaling the image based on the face poses p and y and the scaling value s. Then, the coordinates $x_s$ of the corrected feature points can be obtained by Expression 21 shown below. The constant C on the right side of Expression 21 is defined coordinates (80/2, 80×66.05/169.0) of the middle point between the eyes.

$$x_s = sRX_s + C \quad (21)$$

where $$R \equiv \begin{bmatrix} \cos(y) & \sin(y)\sin(p) & \sin(y)\cos(p) \\ 0 & \cos(p) & -\sin(p) \end{bmatrix}$$

When pixels are actually sampled, pixel edge coordinate representation is transformed into pixel center coordinate representation (−0.5).

Figure 10A:
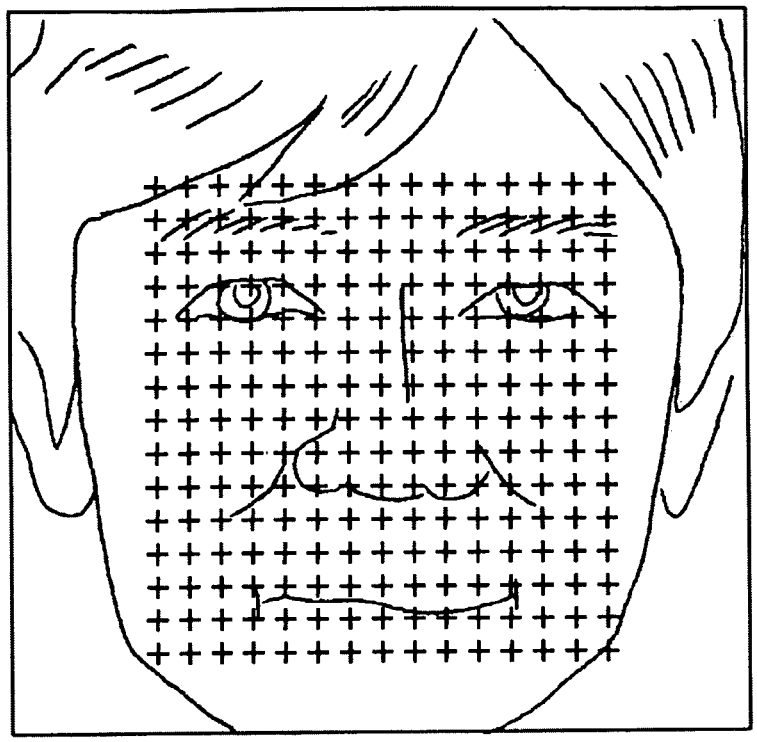
FIG. 10A shows feature points extracted from a face image of an object that is frontally photographed.
Figure 10B:
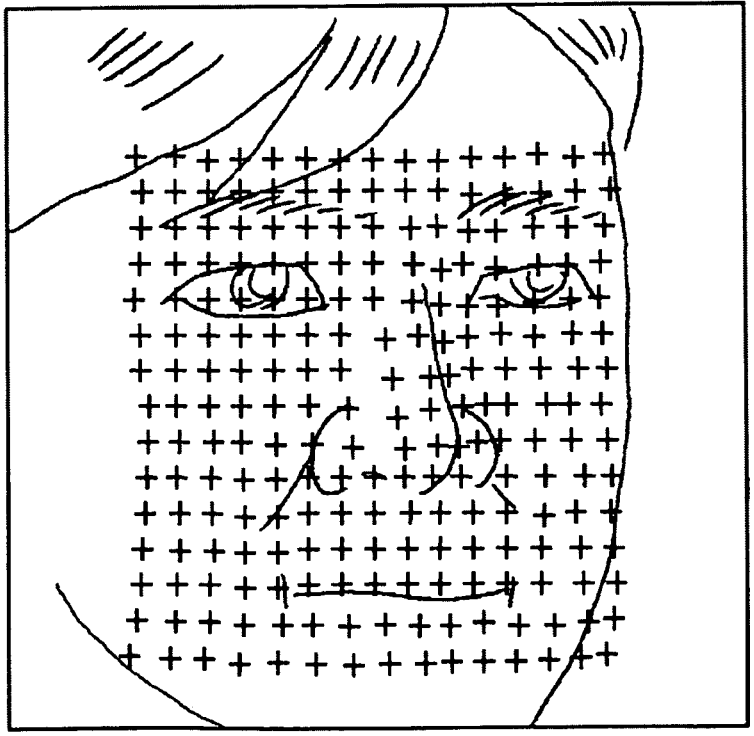
FIG. 10B shows feature points extracted from a face image obtained by diagonally photographing the same object shown in FIG. 10A, the feature points being corrected based on the pose of the face estimated from the positions of face parts (estimated pitch and roll angles).

FIG. 10A shows feature points extracted from a face image of an object photographed frontally. FIG. 10B shows feature points extracted from a face image of the same object photographed diagonally. As will be apparent from a comparison between FIGS. 10A and 10B, in the case of the face image obtained by diagonally photographing the object, the positions of several face parts are detected from the face image. Changes in the face pose such as a pitch and roll are estimated based on the positions of the detected face parts, and the positions of feature points used for identifying the person are corrected based on estimated angles of the pitch and roll. As a result, the accuracy of a subsequent process such as face recognition can be improved.

Adaptive Sampling for Statistical Learning

While a method of adaptive sampling associated with a face recognition process has been described, it is desirable to use the method also in the learning process.

Recognition involves steps of calculating features and discriminant functions associated therewith one by one and making a synthetic final determination. On the contrary, learning is carried out by calculating features at all candidates of feature points in all learning samples using all dimensions of features in advance and sequentially selecting feature points and features in the samples resulting in optimal discrimination of one person from others. Therefore, the process used for learning is completely the same as that for recognition only except that learning requires a greater amount of calculation.

Learning normally involves manually labeled faces and manually given face parts positions instead of detection of faces and detection of face parts. However, the estimation of poses and the correction of sample points using the faces and face parts is performed in a manner similar to that for recognition.

The invention has been described in detail with reference to a specific embodiment of the same. However, it is obvious that modifications and alterations may be made to the embodiment by those skilled in the art without departing from the spirit of the invention.

For example, the invention may be used in man-machine interfaces utilizing face recognition techniques such as personal authentication systems and sex identification, digital cameras employing object recognition techniques for the purpose of automating camera operations, and portable terminals including cellular phones having a digital camera.

The above description merely discloses an exemplary mode of the invention, and the contents of this specification should not be taken in a limiting sense. The gist of the invention should be determined from the appended claims.

What is claimed is:

1. A face image processing apparatus selecting feature points and features used for identifying a person through statistical learning and performing a personal identification process using the selected feature points in a synthetic manner, the apparatus comprising:
   an input unit configured to input a face image detected by arbitrary face detection means;
   a face parts detection unit configured to detect positions of face parts in several locations from an input face image, including roughly estimating a face pose angle from a plurality of face detection results which are in an overlapping relationship;
   a face pose estimation unit configured to estimate face pose based on detected positions of face parts;
   a feature point position correcting unit configured to correct a position of each feature point used for identifying the person based on a result of estimation of face pose by the face pose estimation unit; and
   a face identifying unit configured to identify the person by calculating a feature of the input face image at each feature point after position correction is performed by the feature point position correcting unit and by checking the feature against a feature of a registered face.

2. The face image processing apparatus according to claim 1, wherein the face parts detection unit detects a face part based on a feature associated with a stable feature point which is less susceptible to individual differences from person to person, and
   wherein the face identifying unit identifies a person based on a feature at a feature point where significant differences appear from person to person.

3. The face image processing apparatus according to claim 1, wherein the face pose estimation unit corrects the face image by rolling the face image in a screen such that positions of left and right eyes detected as face parts are aligned horizontally and thereafter estimates angles of rotations about pitch and yaw axes included in the face image obtained by rolling the face image based on a relationship between the positions of face parts detected by the face parts detection unit and an average three-dimensional face model, and
   wherein the feature point position correcting unit corrects the position of each feature point used for identifying the person based on the angles of rotations of the face image about the pitch and yaw axes estimated by the face pose estimation unit.

4. The face image processing apparatus according to claim 1, wherein the face parts detection unit detects coordinates (x0, y0), (x1, y1), (x2, y2), and (x3, y3) of a left eye, a right eye, a nose tip, and a center of a mouth as face parts, respectively,
   wherein the face pose estimation unit corrects rotation in a rolling direction by an angle θ obtained by Expression (1) about an appropriate point such that the left and right eyes are aligned horizontally, and wherein the face pose estimation unit performs a transformation into a position Xp on a coordinate system, having an origin in a middle point between the left and right eyes, using Expression (2),
where $$\theta = \arctan\left(\frac{(y_1 - y_0)}{(x_1 - x_0)}\right), \text{ and} \tag{1}$$

$$X_p = \begin{bmatrix} \cos\theta & -\sin\theta \\ \sin\theta & \cos\theta \end{bmatrix} \begin{bmatrix} x_0 & x_1 & x_2 & x_3 \\ y_0 & y_1 & y_2 & y_3 \end{bmatrix} - \begin{bmatrix} c_x \\ c_y \end{bmatrix}. \tag{2}$$

5. The face image processing apparatus according to claim 4, wherein the face pose estimation unit defines an average three-dimensional face model Xm, elements of which are three-dimensional positions of the left eye, the right eye, the nose tip, and the mouth as face parts, and
wherein the face pose estimation unit estimates angles of rotation p and y included in the face image based on Relational Expression (3) indicating that the three-dimensional face model Xm is transformed into the position Xp on the coordinate system having the origin in the middle point between the left and right eyes when a rotation of the three-dimensional face model is converted by angles of rotation p and y about pitch and yaw axes included in the face image using a rotation matrix R and converting a scale of the rotation matrix R by a scaling value s,
where $$X_p = sRX_m \tag{3}$$

$$\begin{bmatrix} x_{p\_x} \\ x_{p-y} \end{bmatrix} = s \begin{bmatrix} \cos(y) & \sin(y)\sin(p) & \sin(y)\cos(p) \\ 0 & \cos(p) & -\sin(p) \end{bmatrix} \begin{bmatrix} X_{m\_x} \\ X_{m\_y} \\ X_{m\_z} \end{bmatrix}$$

where $$R \equiv \begin{bmatrix} \cos(y) & \sin(y)\sin(p) & \sin(y)\cos(p) \\ 0 & \cos(p) & -\sin(p) \end{bmatrix}.$$

6. The face image processing apparatus according to claim 5, wherein the face pose estimation unit transforms a second row of Expression (3) to obtain Expression (4), solves Expression (4) using a pseudo rotation matrix B, and estimates the angle of rotation p about the pitch axis included in the face image according to Expression (6),
where $$x_{p\_y}^T = [X_{m\_y}^T - X_{m\_z}^T] \begin{bmatrix} s\cos(p) \\ s\sin(p) \end{bmatrix}, \tag{4}$$

$$B = \lfloor X_{m\_y}^T - X_{m\_z}^T \rfloor \tag{5}$$

$$\begin{bmatrix} a_x \\ a_y \end{bmatrix} \equiv \begin{bmatrix} s\cos(p) \\ s\sin(p) \end{bmatrix} = (B^T B)^{-1} B^T x_{p\_y}^T, \text{ and}$$

$$p = \arctan\left(\frac{a_y}{a_x}\right). \tag{6}$$

7. The face image processing apparatus according to claim 6, wherein the face pose estimation unit calculates (BTB)-1BT including an inverse matrix calculation in Expression (5) from a matrix Xm representing three-dimensional positions of feature points of the average three-dimensional face model in advance.

8. The face image processing apparatus according to claim 6, wherein the face pose estimation unit transforms a second column of Expression (3) to obtain Expression (7) after estimating the angle of rotation p about the pitch axis included in the face image, solves Expression (7) using a pseudo rotation matrix D, and estimates the angle of rotation y about the yaw axis included in the face image according to Expression (9),
where $$x_{p\_x} = [X_{m\_x}^T \sin(p) X_{m\_y}^T + \cos(p) X_{m\_z}^T] \begin{bmatrix} s\cos(y) \\ s\sin(y) \end{bmatrix}, \tag{7}$$

$$D = \lfloor X_{m\_y}^T \sin(p) X_{m\_y}^T + \cos(p) X_{m\_z}^T \rfloor \tag{8}$$

$$\begin{bmatrix} b_x \\ b_y \end{bmatrix} \equiv \begin{bmatrix} s\cos(y) \\ s\sin(y) \end{bmatrix} = (D^T D)^{-1} D^T x_{p\_x}^T, \text{ and}$$

$$y = \arctan\left(\frac{b_y}{b_x}\right). \tag{9}$$

9. The face image processing apparatus according to claim 8, wherein the face pose estimation unit averages Expressions (6) and (9) and identifies the scaling value s using Expression (10),
where $$s = \frac{hypot(a_y, a_z) + hypot(b_y, b_z)}{2}. \tag{10}$$

10. The face image processing apparatus according to claim 8, wherein the face pose estimation unit transforms Expression (7) for identifying the angle of rotation y about the yaw axis of the face image obtained from a first row of Expression (3) into Expression (11) and identifies the angle of rotation y about the yaw axis of the face image using Expression (12),
where $$x_{p\_x} = [X_{m\_x}^T \quad X_{m\_y}^T \quad X_{m\_z}^T] \begin{bmatrix} 1 & 0 & 0 \\ 0 & \cos(p) & \sin(p) \\ 0 & -\sin(p) & \cos(p) \end{bmatrix} \begin{bmatrix} s\cos(y) \\ 0 \\ s\sin(y) \end{bmatrix} \tag{11}$$

$$x_{p\_x} = X_m^T R_{3p} v_{3Y}$$

where $$X_m^T = \lfloor X_{m\_x}^T \quad X_{m\_y}^T \quad X_{m\_z}^T \rfloor$$

$$R_{3p} = \begin{bmatrix} 1 & 0 & 0 \\ 0 & \cos(p) & \sin(p) \\ 0 & -\sin(p) & \cos(p) \end{bmatrix}$$

$$v_{3Y} = \begin{bmatrix} s\cos(y) \\ 0 \\ s\sin(y) \end{bmatrix}, \text{ and}$$

$$v_{3Y} = R_{3p}^{-1}(X_M X_M^T)^{-1} X_M x_{p\_x} \tag{12}$$

where $$R_{3p}^{-1} = \begin{bmatrix} 1 & 0 & 0 \\ 0 & \cos(p) & -\sin(p) \\ 0 & \sin(p) & \cos(p) \end{bmatrix}.$$

11. The face image processing apparatus according to claim 10, wherein the face pose estimation unit calculates (XmXmT)-1Xm including an inverse matrix calculation in Expression (12) from a matrix Xm representing three-dimensional positions of the feature points of the average three-dimensional face model in advance.

12. The face image processing apparatus according to claim 10, wherein the feature point position correcting unit obtains coordinates $x_s$ of corrected feature points using Expression (13), where $X_s$ represents three-dimensionally defined coordinates of feature points used for identifying a person, where $x_s$ represents coordinates of feature points obtained by converting rotation and scale based on face poses p and y and the scaling value s, and
where $$x_s = sRX_s + C \quad (13)$$

where $$R \equiv \begin{bmatrix} \cos(y) & \sin(y)\sin(p) & \sin(y)\cos(p) \\ 0 & \cos(p) & -\sin(p) \end{bmatrix}.$$

13. A face image processing method in which feature points and features used for identifying a person are selected through statistical learning and in which a personal identification process is performed using the selected feature points in a synthetic manner, the method comprising the steps of:
   inputting a face image detected by arbitrary face detection means;
   detecting positions of face parts in several locations from an input face image, including roughly estimating a face pose angle from a plurality of face detection results which are in an overlapping relationship;
   estimating face pose based on detected positions of face parts;
   correcting a position of each feature point used for identifying the person based on a result of estimation of face pose at the step of estimating face pose; and
   identifying the person by calculating a feature of the input face image at each feature point after position correction is performed at the feature point position correcting step and by checking the feature against a feature of a registered face.

14. A non-transitory computer-readable storage medium including computer executable instructions, where the instructions, when executed, cause a computer to execute face image processing in which feature points and features used for identifying a person are selected through statistical learning and in which a personal identification process is performed using the selected feature points in a synthetic manner, comprising:
   input means for inputting a face image detected by arbitrary face detection means;
   face parts detection means for detecting positions of face parts in several locations from an input face image, including roughly estimating a face pose angle from a plurality of face detection results which are in an overlapping relationship;
   face pose estimation means for estimating face pose based on detected positions of face parts;
   feature point position correcting means for correcting a position of each feature point used for identifying the person based on a result of estimation of face pose by the face pose estimation means; and
   face identifying means for identifying the person by calculating a feature of the input face image at each feature point after position correction is performed by the feature point position correcting means and by checking the feature against a feature of a registered face.

* * * * *